United States Patent [19]

Brown

[11] 4,111,308
[45] Sep. 5, 1978

[54] CASSETTE TAPE CARTRIDGE HOLDER

[76] Inventor: James L. Brown, 1227 West Cabrini Apt. 901, Chicago, Ill. 60607

[21] Appl. No.: 745,266

[22] Filed: Jan. 14, 1977

[51] Int. Cl.² ............... B65D 85/672; A47F 7/00
[52] U.S. Cl. .................. 211/59.1; 206/387; 211/49 R; 248/294; 248/309 A
[58] Field of Search .............. 211/49, 54.1, 57.1, 211/59.1; 248/274, 288, 291–294, 311 A, 479, 486, 487, 354 P, 401, 402, 424, 425, 302; 206/387

[56] References Cited

U.S. PATENT DOCUMENTS

| 802,705 | 10/1905 | Parker | 248/294 |
| 1,909,429 | 5/1933 | Sherman | 211/49 R |
| 2,205,298 | 6/1940 | Lindner | 211/49 R |
| 3,484,069 | 12/1969 | Larson | 248/221.1 |
| 3,858,910 | 1/1975 | Oetiker | 403/165 X |

Primary Examiner—Roy D. Frazier
Assistant Examiner—Terrell P. Lewis
Attorney, Agent, or Firm—Bernard L. Kleinke

[57] ABSTRACT

A holder for cassette tape cartridges includes a pair of parallel spaced-apart fingers for receiving a pair of spaced-apart openings in the cassette cartridges, and a member connecting the rear end portions of the fingers to the base. In one embodiment of the present invention, the connecting member swivelly connects the pair of parallel spaced-apart fingers to the base and detents secure releaseably the fingers in adjusted positions.

8 Claims, 3 Drawing Figures

CASSETTE TAPE CARTRIDGE HOLDER

Present invention relates in general to a cassette tape cartridge holder, and it more particularly relates to a holder for a plurality of cassette tape cartridges in a convenient manner.

Various different types and kinds of storage equipment have been provided for cassette tape cartridges. For example, reference may be made to the following U.S. Pat. Nos. 3,889,817; 3,907,116 and 3,938,665. Such storage equipment has been provided for cassette magnetic tape cartridges so that they can be conveniently stored and access can be gained in a simple and convenient manner. However, it would be highly desirable to have a holder for cassette tape cartridges which is relatively inexpensive and which can hold in a convenient manner a large number of cassette cartridges. Such a holder should be extremely easy to use and enable all of the cassette tapes to be readily visible at the same time. Moreover, such a cassette tape cartridge holder should be able to be employed in a convenient manner in various different locations including vehicles.

Therefore, the principal object of the present invention is to provide a new and improved cassette tape cartridge holder, which is relatively inexpensive to manufacture and which enables a relatively large number of cassette tape cartridges to be stored and be visible to the user in a convenient manner.

Another object of the present invention is to provide such a new and improved cassette tape cartridge holder, which may be readily employed in various different locations including vehicles.

Briefly, the above and further objects of the present invention are realized by providing a cassette tape cartridge holder, which includes a pair of parallel spaced-apart fingers for receiving a pair of spaced-apart openings in the cassette tape cartridges, and a connecting means fixing the rear-end portions of the fingers to a base for supporting the holder. In one embodiment of the present invention, the connecting means swivelly attaches the parallel fingers to the base so that the cassette cartridges supported by the fingers can be positionally adjusted to enable the cartridges to be viewed in a convenient manner by the user. This feature of the invention is particularly useful when the holder is used in a vehicle where the holder may be attached to a convenient surface on the dashboard of the vehicle or in the glove compartment thereof.

The invention, both as to its organization and method of operation, together with further objects and advantages thereof, will best be understood by reference to the following detailed description taken in connection with the accompanying sheet of drawings, wherein.

Figure 2:
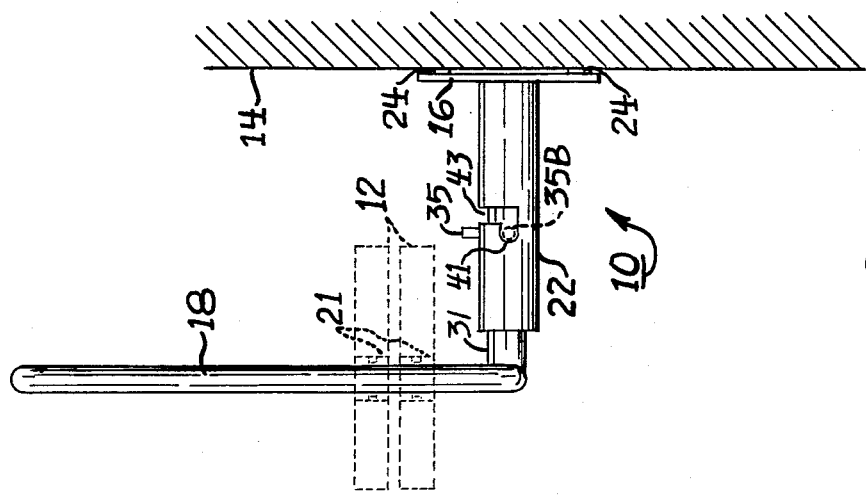
FIG. 2 is a side elevational view of the holder of FIG. 1 illustrating it with a plurality of cassette tape cartridges being supported thereby as shown in broken lines.
Figure 1:
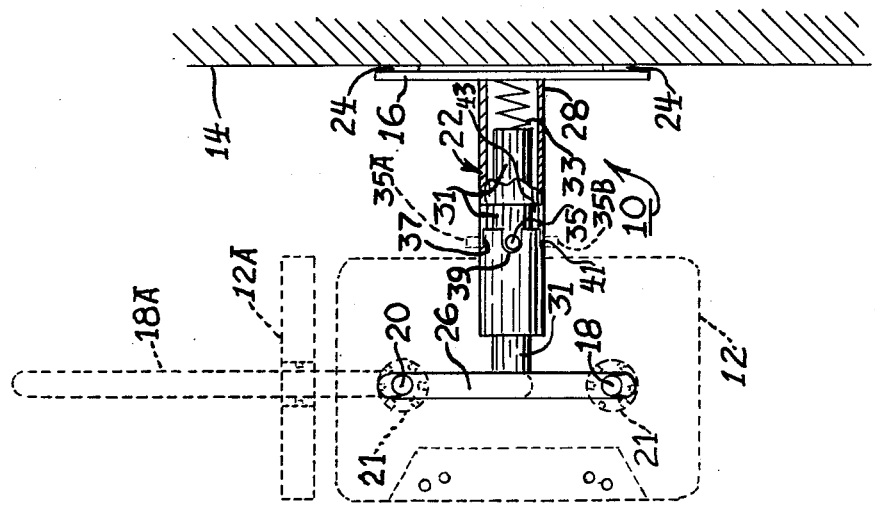
FIG. 1 is a plan view of a cassette tape cartridge holder, which is constructed in accordance with the present invention and which is shown illustrated with a cassette cartridge shown in broken lines and showing it in an adjusted position in broken lines.

Referring now to the drawings, and more particularly to FIGS. 1 and 2 thereof, there is shown a cassette tape cartridge holder 10 which is constructed in accordance with the present invention and which is adapted to hold or store a series of magnetic tape cassette cartridges 12. The cassette holder 10 may be used in different locations and as shown in FIGS. 1 and 2 of the drawings, the cassette tape cartridge holder 10 is mounted on a vertical wall 14. The holder 10 generally comprises a base 16 which is attached to the wall 14 as hereinafter described in greater detail, and a pair of oppositely-disposed spaced-apart fingers 18 and 20 extending in a vertical direction parallel to the wall 14 through a pair of spaced-apart holes 21 of the cassettes 12 to stack them vertically. A connecting device 22 joins the fingers 18 and 20 to the base 16 as hereinafter described in greater detail.

While the holder 10 is shown and described with its fingers 18 and 20 disposed in a vertical position, it should be understood that the holder 10 may be arranged such that the base 16 is resting on a horizontal surface (not shown) so that the fingers 18 and 20 extend in a plane parallel to the horizontal supporting surface.

The base 16 is generally rectangular in shape, but it is to be understood that various different sizes and shapes of bases may be employed. For example, a circular base may also be used. A series of adhesive tape strips 24 secure the base 16 to the supporting surface such as the wall 14.

A bight portion 26 is integrally connected to the rear end portions of the fingers 18 and 20 to form a U shape. The length of the bight 26 is approximately equal to the distance between the holes 21 in the cassette 12.

As shown in FIG. 1 of the drawings, the two fingers 18 and 20 are not completely parallel to one another but instead they converge slightly toward one another as they extend from the bight portion 26. As a result, the fingers 18 and 20 grip the cassette cartridges 12. The fingers 18 and 20 and the bight portion 26 are preferably composed of a one-piece rod which is bent into a U-shape with the fingers slightly converging towards one another to provide a spring tension acting on the cassette cartridges. In this regard, a cassette cartridge may be slipped on to the free distal end portions of the fingers 18 and 20 by separating the distal end portions slightly to align them with the holes 21 in the cassette cartridge. Thereafter, the cassette cartridge is slid along the fingers 18 and 20 under spring tension applied by the separated fingers until the cartridge is slid into close proximity to the bight portion 24 where the fingers are spaced far enough apart to accommodate conveniently the holes 21 is the cartridge. At that position, the spring tension on the fingers 18 and 20 relaxes so that they can deflect inwardly and assume their normal unstressed condition.

Considering now the connecting device 22 in greater detail with reference to the drawings, the connecting device 22 includes a tube 28 which is fixed at one of its ends to the center portion of the base 16. A rod 31 fits into and telescopes with the tube 28 and has its outer distal end fixed to the mid portion of the bight portion 26. A spring 33 is disposed within the tube 28 and is compressed between the base 16 and the end portion of the rod 31 to resiliently urge a radially projecting pin 35 extending from the rod 31 into engagement with one of three notches or openings 37, 39 and 41 in the tube 28. The pin 35 and the three notches cooperate to form detents whereby the rod 31 and the fingers 18 and 26 connected thereto by means of the bight portion 26 may be rotated to an adjusted position and secured in the adjusted position by the pin and the notch associated therewith. For example, as shown in broken lines indicated by reference numerals including the letter A in FIG. 1, the fingers 18 and 20 may be rotated from a vertical disposition through 90° to a horizontal position for the convenience of the user.

The broken line showing of the pin 35 as indicated by the numeral reference character 35B shows where the pin is located in the other adjusted position at 90° to the vertical position shown in solid lines of FIGS. 1 and 2 of the drawings.

In order to facilitate the operation, a connecting opening 43 in the tube 28 interconnects the three notches 37, 39 and 41. The connecting opening 43 extends along the 180° of the circumference of the tube 31.

In operation, in order to move the fingers 18 and 20 to an adjusted position, the fingers 18 and 20 are grasped by the hand of the user and pushed toward the base 16 so that the rod 31 compresses the spring 33 between the rear end of the rod 31 and the base 16. In so doing, the pin 35 moves axially out of engagement with the notch 39. After the pin 35 has cleared the notch 39, the user may rotate the fingers 18 and 20 in a plane parallel to the plane of the wall 14 until the pin 35 moves opposite the notch 37. Thereupon, the user releases the pressure on the fingers 18 and 20 to enable the spring 33 to urge resiliently the rod 31 axially away from the base 16 to cause the pin 35 to enter the notch 37 as indicated by the reference numeral 35A in FIG. 1 of the drawings. In such a position, the fingers 18 and 20 are disposed in a position at 90° to the vertical position shown in solid lines in the drawings. Similarly, the pin 35 can be moved to the notch 41 to dispose the fingers 18 and 20 in a position spaced 180° from the position of the pin indicated at 35A.

It should be noted that the same operation would be employed when the base 16 is positioned on a horizontal-supporting surface such as a table or a dashboard of a vehicle.

Figure 3:
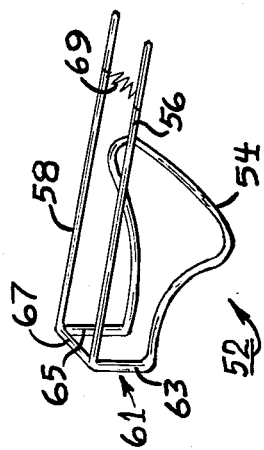
FIG. 3 is a pictorial view of another cassette tape cartridge holder which is also constructed in accordance with the present invention.

Considering now a cassette cartridge holder 52 with reference to FIG. 3 of the drawings, the holder 52 is constructed in accordance with the present invention. The holder 52 is adapted to hold one or more cassette tape cartridges in a similar manner as the holder 10, except that the holder 52 is not swivelly adjustable as is the holder 10 and except that the holder 52 is less expensive to manufacture. The holder 52 includes a base 54 which is integrally connected to a pair of parallel spaced-apart fingers 56 and 58 for receiving and supporting a cassette cartridge (not shown) in a similar manner as the fingers 18 and 20 of the holder 10. A connecting means 61 in the form of a pair of vertically-positioned parallel spaced-apart rod portions 63 and 65 join the fingers 56 and 58 to the base 54 which is in the form of a loop which is mushroomed shaped. Thus, the fingers 56 and 58, the base 54 and the rod portions 63 and 65 are integrally connected to one another and are bent from a single piece of rod stock.

A bight 67 is connected between the rear end portions of the fingers 56 and 58 at the upper ends of the portions 63 and 65 to provide the holder 52 with strength and rigidity.

Since the fingers 56 and 58 are parallel to one another, in order to retain the cassettes in position on the fingers, a coil spring 69 has its end loops threaded onto the fingers 56 and 58 to attach adjustably the coil spring 69 across the finers 56 and 58 to retain the cassette cartridges on the fingers 56 and 58 between the spring 69 and the bight 67. It should be understood that the fingers 56 and 58 extend through the openings in the cassette cartridge in a similar manner as the fingers 18 and 20 extend through the holes 21 in FIG. 1, except that the fingers 56 and 58 are parallel to one another and do not converge toward one another.

While the invention has been described and illustrated in terms of the embodiments of the invention, the scope of the invention should not be deemed limited by the precise embodiment or modification herein described, disclosed, illustrated or shown, such other embodiments or modifications as may be suggested to those having the benefit of the teachings herein being intended to be reserved especially as they fall within the scope and breadth of the claims appended thereto.

What is claimed is:

1. A holder for cassette tape cartridges having a pair of oppositely-disposed spaced-apart openings comprising:

a base;

a pair of spaced-apart fingers for receiving the pair of spaced-apart openings in the cassette tape cartridges to support them; and connecting means attaching the rear end portions of said fingers to said base and spacing said rear end portions of said fingers apart by a distance substantially equal to the distance between the spaced-apart openings in the cartridges for enabling said fingers to extend forwardly from their said rear end portions toward one another convergingly in a common plane to provide spring tension between them when the cartridges are disposed thereon.

2. A holder according in claim 1, wherein said connecting means swivelly attaches said fingers to said base to enable said fingers to swivel about an axis perpendicular to the plane of said fingers.

3. A holder according to claim 2, wherein said connecting means includes detent means for maintaining releasably said fingers in an adjusted position.

4. A holder according to claim 3, wherein said connecting means includes a pair of telescoping members, one of said members being connected to said base and the other one of said members being connected to said fingers.

5. A holder according to claim 4, wherein said telescoping member connected to said base is an elongated tubular member fixed at one of its ends to said base for projecting outwardly therefrom, the other one of said telescoping members being an elongated rod fixedly connected at one of its ends to said fingers and disposed concentrically within the outer tubular member, spring means being disposed within said outer tubular member for urging resiliently said rod axially outwardly from said tubular member, said detent means limiting the outward movement of said rod.

6. A holder according to claim 4, wherein said detent means includes a pin connected to one of said members and a plurality of openings in the other one of said members for receiving selectively said pin.

7. A holder according to claim 6, further including spring means for urging resiliently the pin carrying member axially to cause the pin to enter one of said notches.

8. A holder according to claim 1, wherein said fingers are integrally connected together at their rear end portions to form a U-shaped member.

* * * * *